United States Patent [19]

Spilo

[11] Patent Number: 5,559,978
[45] Date of Patent: Sep. 24, 1996

[54] METHOD FOR INCREASING THE EFFICIENCY OF A VIRTUAL MEMORY SYSTEM BY SELECTIVE COMPRESSION OF RAM MEMORY CONTENTS

[75] Inventor: Michael L. Spilo, New York, N.Y.

[73] Assignee: Helix Software Company, Inc., Long Island City, N.Y.

[21] Appl. No.: 375,172

[22] Filed: Jan. 18, 1995

Related U.S. Application Data

[63] Continuation of Ser. No. 960,720, Oct. 14, 1992, abandoned.

[51] Int. Cl.[6] .............................. G06F 12/08; G06F 13/00
[52] U.S. Cl. ........................ 395/413; 395/600; 395/431; 395/432; 395/478; 395/485; 364/DIG. 1; 364/246.1; 364/252; 364/256.3
[58] Field of Search ..................................... 395/600, 425, 395/413, 431, 432, 478, 485; 364/DIG. 1

[56] References Cited

U.S. PATENT DOCUMENTS

| | | | |
|---|---|---|---|
| 4,467,421 | 8/1984 | White | 364/200 |
| 4,638,426 | 1/1987 | Chang et al. | 364/200 |
| 4,660,130 | 4/1987 | Bartley et al. | 364/200 |
| 4,907,151 | 3/1990 | Bartlett | 364/200 |
| 4,989,134 | 1/1991 | Shaw | 364/200 |
| 5,136,706 | 8/1992 | Courts | 395/600 |
| 5,193,184 | 3/1993 | Belsan et al. | 395/600 |
| 5,237,460 | 8/1993 | Miller et al. | 360/8 |
| 5,239,635 | 8/1993 | Stewart et al. | 395/400 |
| 5,247,638 | 7/1993 | O'Brien et al. | 395/425 |
| 5,317,706 | 5/1994 | Pechter | 395/400 |
| 5,394,534 | 2/1995 | Kulakowski et al. | 395/425 |

*Primary Examiner*—Thomas G. Black
*Assistant Examiner*—Jean R. Homere
*Attorney, Agent, or Firm*—Schweitzer Cornman & Gross

[57] ABSTRACT

A method and system for increasing the efficiency of a virtual memory operating system is provided. In hardware assisted virtual memory, paging systems the preferred embodiment reduces the need for paging to or from non-memory devices by compressing and concatenating inactive regions in place. The compressed and concatenated regions are then queued for paging in the traditional virtual memory methodology. In this system, RAM memory made available by reducing the size of inactive regions is available immediately for use by the standard virtual memory paging system.

6 Claims, 2 Drawing Sheets

METHOD FOR INCREASING THE EFFICIENCY OF A VIRTUAL MEMORY SYSTEM BY SELECTIVE COMPRESSION OF RAM MEMORY CONTENTS

This is a continuing application of U.S. Ser. No. 07/960,720, filed on Oct. 14, 1992, now abandoned.

The present invention relates to virtual memory computer systems and methods and, in particular, to a computer system and method for increasing the efficiency of hardware-assisted virtual memory paging.

BACKGROUND OF THE INVENTION

Virtual memory is a methodology which allows a computer system having a fixed amount of physical memory storage to simulate a system having a substantially greater storage capacity. As application programs expand in complexity and data files expand, the need for greater memory facility increases. With the proliferation of interfaces and operating systems, such as Microsoft Windows, which allow multitasking, the physical memory constraints of personal computer systems have become insufficient. Virtual memory allows memory-intensive applications to be performed on a machine without the physical memory otherwise required.

In a conventional virtual memory system, some method is established, usually through the design of the hardware on which the system is implemented, for allocating a block or part of the memory address space of the system's central processing unit's maximum addressing capability. Actual physical memory resources, being the actual storage required to make the address space useful to computer instructions executing in the processor, do not need to exist in a physical sense in the block being allocated. Hence, the term "virtual memory"—the block of allocated memory exists as a logical entity only. This permits the instructions to be performed as if the memory was physically present.

Through a variety of methodologies, the hardware of the central processor or associated hardware (a Memory Management Unit (MMU)) detects attempts to access these virtual memory blocks within the virtual address space (VAS) of the computing environment. When such an access is detected, control is transferred, again through a variety of known techniques, to a specific part of the operating system designed to handle such requests. This part of the operating system, called the virtual memory control program (VMCP), must then either suspend or terminate the process that is attempting to access memory in the virtual address space which has no physical memory resources assigned to it, or the VMCP must assign physical memory resources to the portion of the virtual address space being accessed so that the access may be completed normally.

By allocating physical memory only on demand, such a procedure allows a limited amount of physical memory resources to be assigned to a vastly greater virtual address space, providing programmers with great flexibility in creating programs which sprawl over great landscapes, while necessitating physical resources sufficient only for some subset of the central processor's capability.

A conventional virtual memory system usually extends this capability further by creating additional physical memory resources through the harnessing of some external storage device. The external storage medium is used to store the contents of parts of the physical memory which have been identified by the virtual memory control program, through a variety of means, as being non-critical or in some fashion not imminently needed. Thus, the VMCP stores unneeded portions of the physical memory on the external storage medium, and retrieves them when physical memory is abundant, or when an access by some part of the computer instruction stream necessitates the retrieval of the contents of the virtual address space memory block.

Newly designed microprocessors have brought virtual memory systems to the desktop, allowing operating environments to take advantage of virtual memory schemes formerly the realm of mainframe and super minicomputers. One such system is the Windows 386 Enhanced Mode operating environment offered by Microsoft Corporation of Redmond, Wash.

The portion of the Windows operating environment designed to handle the management of memory is a standard VMCP in which the page table of the Intel 80386 microprocessor is used to control access to the virtual address space of the microprocessor so that the processor causes a fault condition to occur whenever an access is attempted to a section of the virtual address space which does not have physical memory associated with it. The VMCP part of the operating environment captures the fault condition and either terminates the task, suspends the task, or provides the necessary resource to allow the task to proceed.

A problem occurs in all virtual memory control programs, however, when the resources required substantially exceed the physical resources available on the system. This can occur whenever the physical memory resources available to the VMCP fall short of the active memory needed, such as by a complex task being performed by the system, or by a large number of concurrent tasks being executed within the system. In this event, the VMCP will either abort attempts to allocate memory, due to a lack of non-critical memory which can be removed to secondary storage or due to a shortage of total, primary and secondary storage; or, alternatively, the VMCP will be forced to continuously store and retrieve large sections of physical memory from the secondary storage medium in rapid succession.

In the first instance, the system becomes unable to perform a designated task, and in the second instance, the system is forced to spend an inordinate portion of its capacity copying to and from the secondary storage system. In the case of a typical personal computer system, the secondary storage system is a personal computer fixed (or hard) disk which operates at speeds which make the first alternative of terminating processes seem almost preferable. The problem is further aggravated by the physical constraints introduced by the architecture of such personal computer fixed disk systems. In most such systems the disk may be inaccessible during certain, "higher priority" operations, such as a timer interrupt or a keyboard, event. This further slows the response of the system. And in any event, the disk is too slow in accessing to support the relocation of information that is accessed at a speed or frequency higher than the fairly low transfer rate of such fixed disk devices. This creates a greater demand, in certain applications, for non-movable, critical physical memory.

SUMMARY OF THE INVENTION

It is an object of the present invention to provide an improved method and system for managing the physical memory resources of a virtual memory system.

A further object of the present invention is to provide such a method and system which will reduce or avoid the necessity of a secondary storage capacity.

Yet a further object of the present invention is to reduce or eliminate the instances in which such a virtual memory system fails due to lack of availability of non-critical memory resources.

These and other objects, which will be apparent as the invention is described in greater detail below, are obtained by providing an improved method and system for virtual memory management which interacts with or replaces the virtual memory control program of the operating system or environment of the target system and substitutes an alternate method and system for managing physical memory resources. Regions determined to be non-critical are combined and compressed using techniques of data compression known to those skilled in the art.

The combined and compressed non-critical regions occupy a smaller portion of the physical memory resources of the system, thus enlarging the pool of available memory resources. The present invention also provides for the compression of critical system resources which are least used, providing access to a larger pool of physical memory resources than previously thought possible.

DETAILED DESCRIPTION OF THE INVENTION

Figure 1:
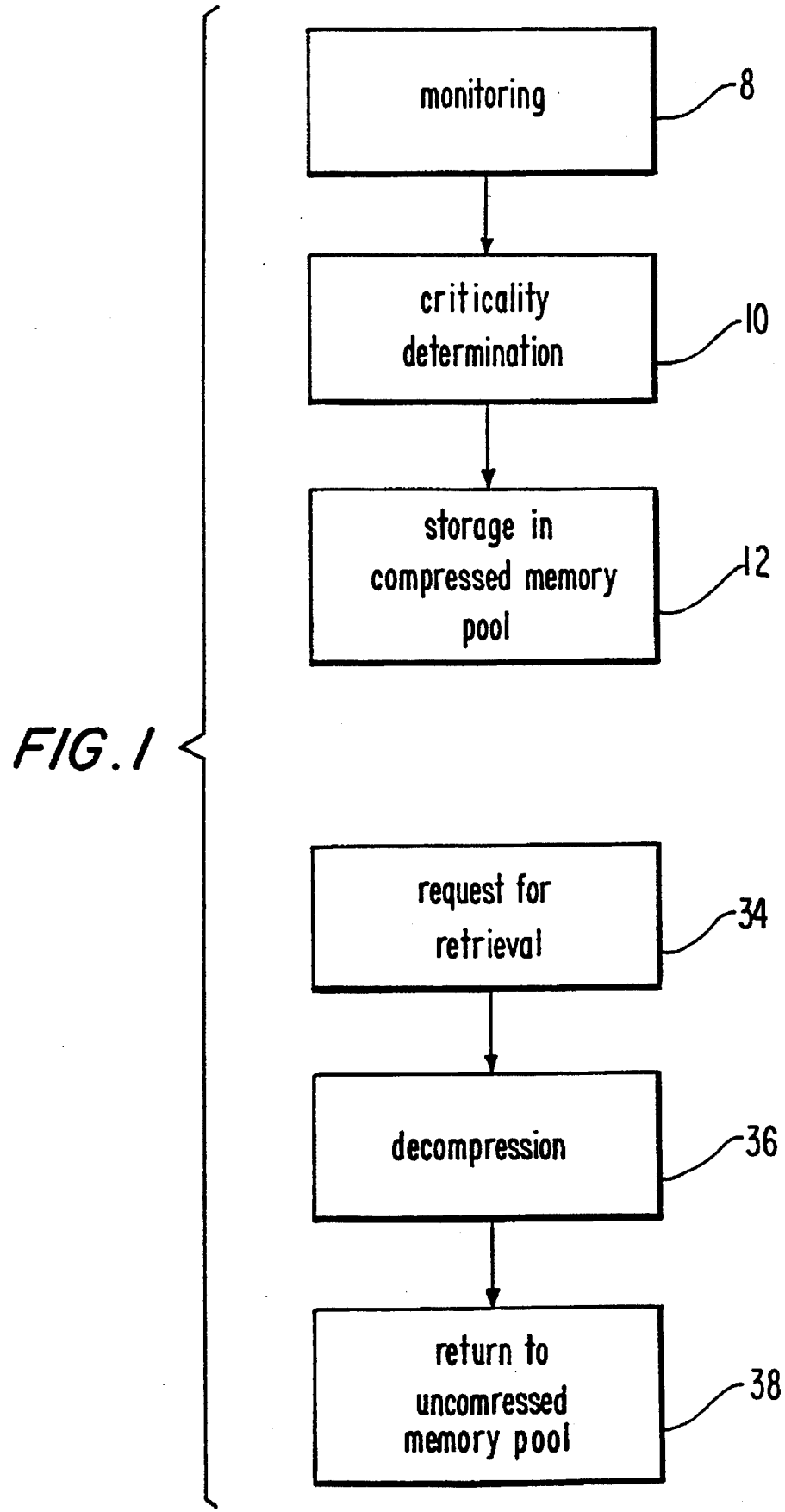
FIG. 1 is a block diagram of the steps of the process of the present invention.

In order to allow a decision to be made as to what portions of memory can be compressed, the present invention monitors operation of the computer's memory resources. A variety of known methodologies are available for such a procedure, such as the intercepting of allocation requests and the polling of free resources. Utilization of available memory is monitored at 8, along with a determination of critical, as opposed to non-critical, regions as seen at 10 in FIG. 1. Criticality may be determined by a variety of factors known in the art, including the type of information stored, prior usage, anticipated future usage, and the like, and in many operating systems is usually declared by the program requesting the memory.

As the system capacity is approached, portions of memory are compressed at 12 to free up additional memory for utilization. Once again, the point at which compression occurs may depend on a variety of factors, such as the rate at which memory is being occupied, the nature of the information being placed therein, and the like.

Upon determination that the critical point has been reached, the compression of portions of memory is performed using a known data compression algorithm. Such compression may be preferentially performed on portions of memory determined to be "non-critical", to minimize the likelihood of repeated subsequent de-compression and compression. Typically, the compressed regions are retained in memory, rather than being transferred to other storage, such as fixed disk.

Figure 2:
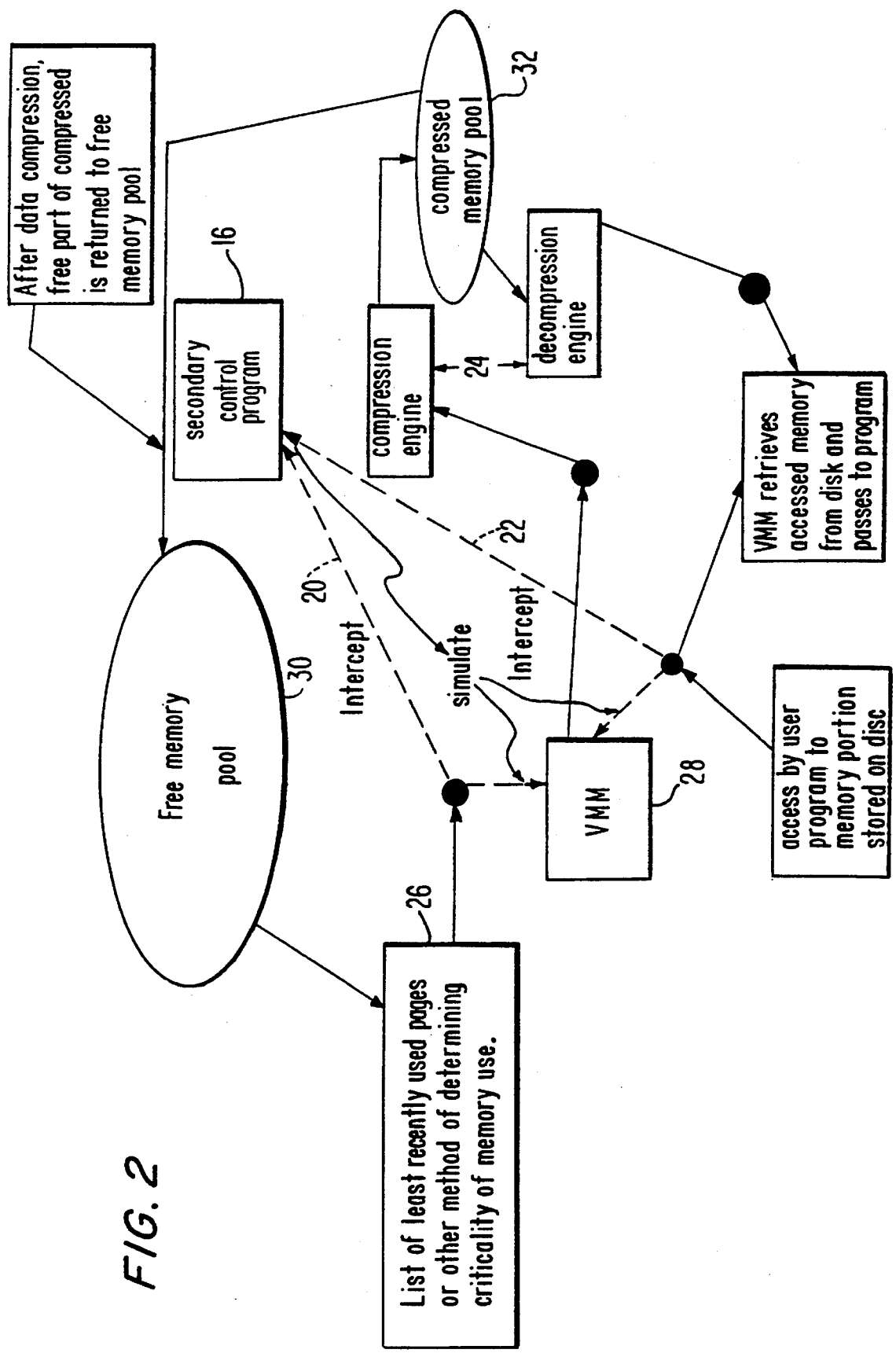
FIG. 2 is a representation of the methodology of the invention in which a secondary memory controller is utilized.

In a presently-contemplated embodiment as depicted in FIG. 2, physical memory resource determination by the primary virtual memory control program ("VMM") 28, such as the Windows environment page table, is supplemented by incorporation of the methodology of the present invention into what may be defined as a secondary virtual memory control program 16. The secondary virtual memory control program controls access to system physical memory resources (including free and compressed memory pools 30, 32), while simulating at 18 to the primary control program a state in which all memory resources appear as critical and in use. This simulation effectively prevents transfer of memory resources by the virtual memory control program. The monitoring of memory, along with actual criticality and utilization determinations 26 and compression/decompression 24, are controlled by the secondary program as shown by the intercept paths 20, 22.

The primary virtual memory control program can be utilized, however, to transfer compressed portions to secondary storage. The primary virtual memory control program is informed by the secondary virtual memory control program that certain regions, which correspond to those portions determined by the present method through the secondary virtual memory control program to be non-critical, are no longer critical and thus may be passed in the compressed form to secondary storage. Similarly, a simulated access to such a copied region may be generated by the secondary virtual memory control program and passed to the primary virtual memory control program, whereby the stored region is retrieved from secondary storage and reinstalled into memory. The secondary virtual memory control program may then decompress the region as required. Thus, the capacity of the secondary storage is increased by the compressor ratio.

When the non-critical resources are compressed, either in a combined form which provides for more efficient compression, or individually, the resulting compressed memory region is smaller than the original region which held the same information. The difference in storage space between the compressed and non-compressed regions becomes available immediately as a usable physical resource and can be added to a global pool of such resources.

The system maintains a record of the compressed regions to allow them to be accessed and decompressed when needed. Thus, referring again to FIG. 1, when an access is attempted at 34 to be made to a region of the virtual address space which has no physical memory associated with it, the appropriate compressed regions are accessed and decompressed at 36 into available physical memory at 38 which is then placed at the disposal of the executing process. This provides an effective increase in physical memory resources which is proportional to the compression ratio achieved by the data compression algorithm used. However, by implementing this methodology a still further advantage is gained.

Since there is no need to access secondary storage media to re-assemble regions which have been compressed, the speed with which regions can be re-created is greatly enhanced. In addition, access to primary storage is never secondary to other devices, so that critical regions of physical memory may be compressed as well without loss of function. This effectively increases the pool of physical memory resources under control by the VMCP creating a larger resource pool than possible using a secondary storage medium alone.

The present invention also provides for the seamless integration of the preferred embodiment into an existing virtual memory system and for using the operating environments current VMCP and a second tier VMCP to control the relocation of compressed regions to secondary storage. Implementation of the invention may be carried out using known programming and system analysis techniques by those skilled in the art.

I claim:

1. A method for managing RAM memory in a virtual memory computer system having a CPU and RAM, comprising the steps of:

a) monitoring the computer system to track the extent of usage and the criticality of RAM memory regions utilized, said usage being the frequency and extent of use of the RAM regions by the CPU and said criticality being the ability of the CPU to function without immediate access to the contents of such memory regions;

b) determining when system RAM is sufficiently depleted with reference to operating system and user program requirements to require augmentation;

c) upon determination of sufficient depletion compressing the contents of a portion of memory according to a determined priority based upon relative usage and criticality of RAM regions available for compression to create a compressed portion in RAM memory and freeing the RAM memory previously occupied by the uncompressed contents and unoccupied by the compressed contents for other use;

d) awaiting an attempt by the CPU to access data contained in said compressed portion and suspending such access; and e) decompressing a portion of the compressed RAM portion bearing the data sought to be accessed and passing the access to the decompressed RAM portion.

2. The method of claim 1, wherein said compression step includes the further step of transferring the compressed contents from RAM to secondary storage and said decompression step includes the step of returning said decompressed portion to RAM.

3. The method of claim 1, wherein said criticality monitoring comprises the step of receiving criticality information generated by a user program.

4. The method of claim 2, wherein said criticality monitoring comprises the step of receiving criticality information generated by a user program.

5. A method for the control of virtual memory resources in a computer system having a CPU, a secondary storage medium and a virtual memory control program, comprising the steps of:

a) intercepting physical memory resource allocation activity by said virtual memory control program to ascertain the status of memory resources and to assign a criticality value to memory resources based upon the ability of the CPU to function without immediate access to the contents of such memory resources;

b) simulating a continuing condition wherein all memory resources appear as sufficiently critical and occupied to the virtual memory control program such that active memory control by said virtual memory control program is suspended;

c) determining when system memory resources are sufficiently depleted with reference to operating system and user program requirements to require augmentation;

d) compressing the contents of a portion of RAM memory according to a determined priority based upon relative criticality of RAM regions available for compression and freeing the memory previously occupied by the uncompressed contents for other use;

e) awaiting an attempt to access a compressed portion of RAM and suspending such access; and f) decompressing a portion of the compressed RAM portion sought to be accessed and passing the access to said decompressed RAM portion.

6. The method of claim 5 further comprising the steps of a) causing the virtual memory control program to write at least one compressed non-critical region to secondary storage; and b) causing the virtual memory control program to retrieve a compressed region that has been removed to secondary storage by simulating an access to said region.

* * * * *